UNITED STATES PATENT OFFICE.

FREDERICK H. BORCHERDT, OF OAK PARK, ILLINOIS.

INFANT FOOD.

1,375,893.     Specification of Letters Patent.     Patented Apr. 26, 1921.

No Drawing.     Application filed July 29, 1916. Serial No. 112,008.

*To all whom it may concern:*

Be it known that I, FREDERICK H. BORCHERDT, a citizen of the United States of America, and resident of Oak Park, Cook county, Illinois, have invented a certain new and useful Improvement in Infant Foods, of which the following is a specification.

My invention relates to the manufacture of what is ordinarily called malt soup. This is used as a food for infants. It consists, ordinarily, of a mixture of malt extract, potassium carbonate, wheat flour and milk in definite proportions.

Generally stated, the object of my invention is to provide an improved process of manufacture and a product thereof which will facilitate the preparation of the malt soup for use.

Special objects are to provide an improved process of manufacture whereby the various ingredients can all be thoroughly combined and supplied to the user in the form of a dry powder which will insure practically as good results, in certain respects, as would be obtained by the use of wheat flour mixed with liquid malt soup extract and milk. Ordinarily, when the syrupy liquid known as malt soup extract is employed, the mixing is done at the time that it is desired to use the food, and requires some boiling over a slow fire. With this method, the ingredients are correctly combined, but the preparation of the food is made difficult for the ordinary person. As stated, therefore, one object of my invention is to provide ingredients in such a form that, although dry, the results will be practically as good as though the food had been prepared by the use of malt soup extract, etc., in the old way.

To these and other useful ends, my invention consists in matters hereinafter set forth and claimed.

In carrying out the invention, malt extract is first prepared by the digestion and extraction of barley malt according to a well-known process which obtains a heavy syrupy liquid containing maltose, dextrin, protein and salts and about twenty-two per cent. of moisture. The malt extract is then mixed with fifty per cent. of its volume of distilled water. To this solution is added the potassium carbonate which has been previously dissolved in a small quantity of distilled water. For each one hundred grams of malt extract, there should be one and one-tenth grams of potassium carbonate. This mixture is then evaporated in a vacuum to a heavy syrupy liquid having a specific gravity of about one and forty-one hundredths. The heavy syrupy liquid resulting from this is called malt soup extract and is a well-known product. Wheat flour is then mixed with fifteen times its weight of warm water and brought to a boil and boiled for thirty minutes. The boiling gelatinizes the wheat flour, and to this thin solution of wheat flour the heavy syrupy liquid called malt soup extract is then added. For each one hundred grams of malt soup extract there should be about fifty grams of wheat flour. This method, of course, does not convert the starch of the flour, but leaves the starch free. The resulting solution is then dried and reduced to a powder by any suitable, known or approved process. This powder is then put up in bottles or packages and sold to the public.

The method of using the said powder is as follows: A suitable quantity of the powder is dissolved in the requisite quantity of water and milk. No boiling is necessary at this time, as that was all done in the manufacture of the commercial product. Consequently, the preparation of the food for use, from the powder which constitutes the finished product, is very simple, and mistakes are not as likely to occur as with the old method. The free starch counteracts the stomach fermentation which is liable to result from the use of sugar. Consequently, where wheat flour is used, as explained, the free starch is an important consideration.

While I have referred to my invention as an infant food, it will be understood, of course, that it is not necessarily limited to this particular use, but may be used also by adults, if such is desirable or necessary. Furthermore, while my invention as here disclosed is of that particular form in which the chief ingredient, to-wit, malt soup extract dried and reduced to a powder, is mixed with flour by combining the two in a solution, it will be understood that the dried and powdered malt soup extract may be used alone and in simple form. In either case, however, the final product is a dry substance comprising malt soup extract in powdered form. The expression "malt soup extract," as previously shown, has a definite and well defined meaning, and calls for certain ingredients in definite form and proportion. It is the common and well known name for a certain malt product. As herein disclosed, malt soup extract may be combined in solution with boiled wheat flour, in the manner explained, when a product of this nature is desired. On the other hand, the malt soup extract may be dried and reduced to powder and used alone, for various purposes, or it may be combined with other ingredients. In any event, however, the final product will consist of a dry substance comprising malt soup extract in dried and powdered form, which means, of course, that the necessary ingredients have been combined in solution to form the malt soup extract, and that this extract has then been dried and reduced to powder either with or without some other ingredient.

It will be seen, therefore, that my invention is essentially a malt extract product, and process of manufacture thereof. Malt extract, of course, like malt soup extract, has a definite and well defined meaning.

What I claim as my invention is:—

1. The process of making a dry malt extract product for use as an infant food, comprising the boiling of wheat flour, adding malt soup extract to the boiled flour, leaving free starch in the mixture, and then drying and reducing the solution to a powder.

2. The process of making a dry malt extract product for use as an infant food, comprising the mixing of boiled flour with a malt extract containing potassium carbonate as one of the essential elements thereof, leaving free starch in the mixture, and then drying and reducing the solution to a powder.

3. A malt extract product for use as an infant food, comprising a dry substance containing boiled wheat flour with free starch and malt soup extract in powdered form.

4. A malt extract product for use as an infant food, comprising a dry substance containing as essential elements thereof boiled wheat flour with free starch, maltose, dextrin, protein and potassium carbonate in powdered form.

Signed by me at Chicago, Illinois, this 19th day of June, 1916.

FREDERICK H. BORCHERDT.